United States Patent
Henriksen et al.

(10) Patent No.: US 11,220,644 B2
(45) Date of Patent: Jan. 11, 2022

(54) METHOD FOR REDUCING THE TAR CONTENT IN PYROLYSIS GAS

(71) Applicant: Danmarks Tekniske Universitet, Kgs. Lyngby (DK)

(72) Inventors: Ulrik Birk Henriksen, Soborg (DK); Jesper Ahrenfeldt, Frederiksvaerk (DK)

(73) Assignee: Danmarks Tekniske Universitet, Lyngby (DK)

(*) Notice: Subject to any disclaimer, the term of this patent is extended or adjusted under 35 U.S.C. 154(b) by 0 days.

(21) Appl. No.: 16/652,648

(22) PCT Filed: Oct. 12, 2018

(86) PCT No.: PCT/DK2018/050257
§ 371 (c)(1),
(2) Date: Mar. 31, 2020

(87) PCT Pub. No.: WO2019/072351
PCT Pub. Date: Apr. 18, 2019

(65) Prior Publication Data
US 2020/0239795 A1    Jul. 30, 2020

(30) Foreign Application Priority Data
Oct. 12, 2017  (DK) .......................... PA 2017 70776

(51) Int. Cl.
*C10K 1/04*   (2006.01)
*C10J 3/64*   (2006.01)
(Continued)

(52) U.S. Cl.
CPC ................. *C10K 1/046* (2013.01); *C10J 3/64* (2013.01); *C10J 3/721* (2013.01); *C10J 3/84* (2013.01);
(Continued)

(58) Field of Classification Search
CPC ........ C10K 1/046; C10K 1/024; C10K 3/005; C10J 3/84; C10J 3/64
See application file for complete search history.

(56) References Cited

U.S. PATENT DOCUMENTS 4,407,699 A * 10/1983 Flockenhaus ........... C10B 27/00
                                                       201/39
5,069,765 A * 12/1991 Lewis ...................... C10J 3/723
                                                      204/173
(Continued)

FOREIGN PATENT DOCUMENTS

CN    1916123 A    2/2007
CN    101139532 A  3/2008
(Continued)

OTHER PUBLICATIONS

International Search Report and Written Opinion for PCT/DK2018/050257, dated Jan. 11, 2019, 9 pages.
(Continued)

*Primary Examiner* — Matthew J Merkling
(74) *Attorney, Agent, or Firm* — Blank Rome LLP

(57) ABSTRACT

Disclosed is a method for reducing the tar content in pyrolysis gas generated in a pyrolysis reactor (1). The method comprises the steps of: guiding the pyrolysis gas through a filter (2) to remove at least 90% of all the particles in the pyrolysis gas having a particle size down to 7μ and preferably down to 4μ from the pyrolysis gas, partially oxidizing the pyrolysis gas in a partial oxidation reactor (3) to remove tar from the pyrolysis gas, and guiding the pyrolysis gas through a coke bed (4) to further remove tar from the pyrolysis gas. Furthermore, a two-stage gasifier (6) is disclosed.

18 Claims, 2 Drawing Sheets

Figure 1:
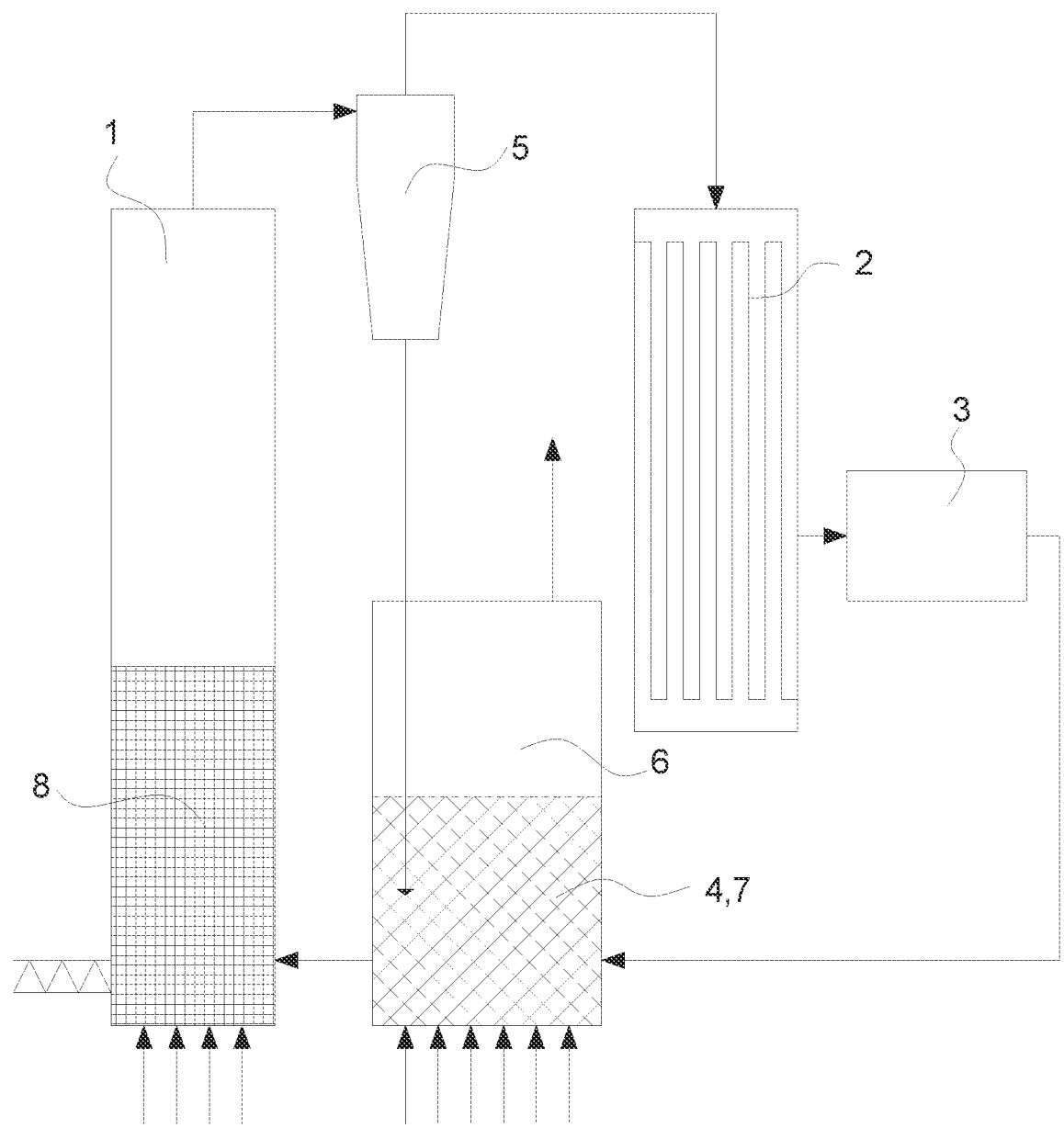

(51) Int. Cl.
    C10J 3/72    (2006.01)
    C10J 3/84    (2006.01)
    C10K 1/02    (2006.01)
    C10K 1/32    (2006.01)
    C10K 1/34    (2006.01)
    C10K 3/00    (2006.01)

(52) U.S. Cl.
    CPC ............ C10K 1/024 (2013.01); C10K 1/32 (2013.01); C10K 1/34 (2013.01); C10K 3/005 (2013.01); *C10J 2300/092* (2013.01)

(56) References Cited

U.S. PATENT DOCUMENTS

| | | | |
|---|---|---|---|
| 8,764,856 B2 | 7/2014 | Xu et al. | |
| 2008/0236043 A1* | 10/2008 | Dinjus | C10J 3/466 48/197 R |
| 2009/0020052 A1* | 1/2009 | Becchetti | F23G 5/46 110/346 |
| 2010/0148122 A1 | 6/2010 | Breton et al. | |
| 2010/0237290 A1 | 9/2010 | Rolland et al. | |
| 2011/0083367 A1* | 4/2011 | Tetzlaff | C10J 3/54 48/111 |
| 2013/0185999 A1* | 7/2013 | Chen | F23G 5/027 48/111 |
| 2017/0362512 A1* | 12/2017 | Hornung | C10B 53/07 |

FOREIGN PATENT DOCUMENTS

| | | |
|---|---|---|
| CN | 102703131 A | 10/2012 |
| CN | 103305285 A | 9/2013 |
| CN | 106336907 A | 1/2017 |
| EP | 3219777 A1 | 9/2017 |
| WO | WO-01/68789 A1 | 9/2001 |
| WO | WO-2019/019319 A2 | 2/2010 |
| WO | WO-2014/094308 A1 | 6/2014 |
| WO | WO-2015/090251 A1 | 6/2015 |
| WO | WO-2017/135811 A1 | 8/2017 |

OTHER PUBLICATIONS

Young-Kon Choi, et al., "A New Type Three-Stage Gasification of Dried Sewage Sludge: Effects of Equivalence Ratio, Weight Ratio of Activated Carbon to Feed, and Feed Rate on Gas Composition and Tar, $NH_3$ and $H_2S$ Removal and Results of Approximately 5 h Gasification", www.elsevier.com/locate/energy; Energy 118, 2017, pp. 139-146.

E. Kurkela, et al., "Steam-Oxygen Gasification of Forest Residues and Bark Followed by Hot Gas Filtration and Catalytic Reforming of Tars: Results of an Extended Time Test", Fuel Processing Technology, www.elsevier.com/locate/fuproc; 141; 2016, pp. 148-158.

J. D. Bentzen, et al., "Upscale of the Two-Stage Gasification Process", Proceedings of 2. World Conference and Technology Exhibition on Biomass for Energy and Industry; 2004; 5 pgs.

"Cyclone Pyrolysis High Flux Circulation Gasification Device and Process", https://ops.epo.org/tfly/; Jan. 5, 2018, 8 pgs.

\* cited by examiner

METHOD FOR REDUCING THE TAR CONTENT IN PYROLYSIS GAS

RELATED APPLICATIONS

This application is a national phase of PCT/DK2018/050257, filed on Oct. 12, 2018, which claims the benefit of Danish Application No. PA 2017 70776, filed on Oct. 12, 2017. The entire contents of those applications are hereby incorporated by reference.

FIELD OF THE INVENTION

The invention relates to a method for reducing the tar content in pyrolysis gas generated in a pyrolysis reactor and it relates to a two-stage gasifier arranged to remove tar from pyrolysis gas.

BACKGROUND OF THE INVENTION

Producing product gas from biomass, coal or other is well known in the art e.g. by means of two stage gasification typically based on externally heated pyrolysis and a coke bed in downstream configuration. However, it is difficult or complex to efficiently remove tar and dust from the resulting product gas.

Thus, from EP 3 219 777 A1 it is known to guide pyrolysis gas through a cyclone filter and into a combustion chamber where the gas is at least partially combusted to raise the temperature to over 1000° C. before some of the gas is guided into an anoxic decarburization unit where tar is removed from the gas. But this system is vulnerable and expensive to maintained.

It is therefore an object of the present invention to provide for a cost-efficient technique for producing a clean product gas.

THE INVENTION

The invention provides for a method for reducing the tar content in pyrolysis gas generated in a pyrolysis reactor. The method comprises the steps of:
  guiding the pyrolysis gas through one or more filters to remove at least 90% of all the particles in the pyrolysis gas having a particle size down to 7μ and preferably down to 4μ from the pyrolysis gas,
  partially oxidizing the pyrolysis gas in a partial oxidation reactor to remove tar from the pyrolysis gas, and
  guiding the pyrolysis gas through a coke bed to further remove tar from the pyrolysis gas.

The melting point of most particles in the produced pyrolysis gas is around 780° C. and during the partially oxidizing process the temperature of the gas is raised to over 1000° C. It is therefore known to filter the pyrolysis gas before it is oxidized—e.g. as shown by means of the cyclone filter in EP 3 219 777 A1. But when certain types of fuel are used—such as e.g. straw material—the pyrolysis gas will contain much fine ash and large quantities of very small particles particles when it leaves the pyrolysis reactor and merely guiding the gas through a cyclone filter is not enough to prevent harmful particles from passing. Thus, filtering the gas thoroughly—i.e. removing substantially all particles down to 7μ and preferably down to 4μ from the pyrolysis gas before it enters a separate partial oxidation reactor and a subsequent coke bed is advantageous in that the temperature hereby can be raised sufficiently in the tar decomposition process—i.e. in the partial oxidation reactor and the coke bed—to ensure efficient tar decomposition while reducing the risk of melting ash, dust and other foreign objects in the pyrolysis gas, which otherwise would lead to problematic deposits, slag formations, incrustations, fur and/or sedimentation. And guiding the filtered and partial oxidized pyrolysis gas through a coke bed will ensure an even more efficient tar decomposition because the temperature can be raised sufficiently substantially without risking problematic deposits, slag formations, incrustations, fur and/or sedimentation.

Partial oxidization inside the pyrolysis reactor or the coke bed is practical because the pyrolysis reactor and the coke bed is already cable of handling the high temperatures generated by the combustion. However, arranging the partial oxidation reactor external to the pyrolysis reactor and the coke bed is advantageous in that it provides a more controlled environment and thereby a more controlled partial oxidation and thereby better tar decomposition.

In this context, the term "pyrolysis reactor" should be understood as any kind of unit capable of running a pyrolysis process, which is a thermochemical decomposition of organic material or fossil fuel at elevated temperatures in the absence of oxygen (or any halogen). Oxygen may be present (e.g. in relation to a concurrent or preceding combustion) but the oxygen does not form part of the pyrolysis process itself. Pyrolysis involves the simultaneous change of chemical composition and physical phase, and is irreversible. Pyrolysis is a type of thermolyzes, and is most commonly observed in organic materials exposed to high temperatures typically starting at 200-300° C. and up to 500 C or even higher. In general, pyrolysis of organic substances or fossil fuels produces gas and liquid products and leaves a solid residue richer in carbon content, which in this embodiment is referred to as pyrolysis coke but is also often referred to as pyrolysis char. It should also be noted that in this context the term "pyrolysis" or "pyrolyzed" also covers torrefaction which is a mild form of pyrolysis at temperatures typically between 200 and 320° C. depending on the specific material being pyrolyzed.

In this context, the term "filter" is to be understood as any kind of a device (usually a membrane or layer) that is designed to physically block objects or substances at least down to the size specified in the claims while letting smaller ones through. I.e. any kind of filter suitable for separating particles from the pyrolysis gas leaving the pyrolysis reactor by means of a filtering process—such as any kind of high temperature filter, High efficiency particulate air (HEPA) filter, candle filters, sinter metal filters, sieves, strainers or other or any combination thereof.

In an aspect, the method further comprises the step of guiding the pyrolysis gas through a cyclone to remove particles in the pyrolysis gas having a particle size down to 20μ and preferably down to 12μ from the pyrolysis gas, before the pyrolysis gas is guided through the one or more filters.

A cyclone is efficient at removing larger particles from pyrolysis gas and it is therefore advantageous to pass the pyrolysis gas through a cyclone before it is filtered to increase the efficiency of the subsequent filtering process.

In this context a cyclone filter should be understood as a device in which a high-speed rotating gas flow is established within a cylindrical or conical container called a cyclone. The gas flows in a helical pattern, beginning at the top (wide end) of the cyclone and ending at the bottom (narrow) end before exiting the cyclone in a straight stream through the center of the cyclone and out the top. Larger (denser) particles in the rotating stream have too much inertia to follow the tight curve of the stream, and thus strike the outside wall, then fall to the bottom of the cyclone where they can be removed. In a conical system, as the rotating flow moves towards the narrow end of the cyclone, the rotational radius of the stream is reduced, thus separating smaller and smaller particles. The cyclone geometry, together with volumetric flow rate, defines the cut point of the cyclone.

In an aspect, the particles that are removed by the cyclone are guided into the coke bed to form part of the coke bed and/or into a gasifier.

Guiding the removed particles into the coke bed and/or into a gasifier is advantageous in that in the coke bed and/or the gasifier the removed particles can aid in tar removal and thus serve a purpose rather than being surplus waste.

In an aspect, the particles that are removed by the one or more filters are guided into the coke bed to form part of the coke bed and/or into a gasifier.

Guiding the removed particles into the coke bed and/or into a gasifier is advantageous in that in the coke bed and/or the gasifier the removed particles can aid in tar removal and thus serve a purpose rather than being surplus waste.

In an aspect, the one or more filters remove at least 90% of all the particles in the pyrolysis gas having a particle size down to 2µ and preferably down to 0.5µ from the pyrolysis gas, If even smaller particles are removed during the filtering process the risk of problematic deposits, slag formations, incrustations, fur and/or sedimentation is further reduced.

In an aspect, the coke bed is arranged inside a gasifier arranged to gasify pyrolysis coke generated in the pyrolysis reactor.

Using a gasifier arranged to gasify the pyrolysis coke generated in the pyrolysis reactor as the coke bed enables as simple and efficient tar removal process.

It should be emphasised that the term "gasifier" is to be understood as any kind of device suitable for running a gasification process in which organic or based carbonaceous materials is converted into mainly carbon monoxide, hydrogen and carbon dioxide. This is achieved in the gasifier by reacting the material at high temperatures (typically higher than 700° C.). The resulting gas mixture is in this embodiment called product gas but could in other embodiments be referred to as syngas, synthesis gas, producer gas or other and is itself a fuel.

In an aspect, the partially oxidized pyrolysis gas is guided substantially uncooled into the gasifier.

If the temperature of the partially oxidized pyrolysis gas is too high when it enters the gasifier there will typically be a risk of problematic deposits, slag formations, incrustations, fur and/or sedimentation. However, it is advantageous that the partially oxidized pyrolysis gas can guided substantially uncooled into the gasifier to ensure a more inexpensive and efficient process.

In an aspect, the coke bed is arranged external to the pyrolysis reactor and external to a gasifier arranged to gasify pyrolysis coke generated in the pyrolysis reactor.

Forming the coke bed separate from the pyrolysis reactor and the gasifier is advantageous in that the coke bed hereby can be formed by external coke thus ensuring a better and more controlled tar decomposition in the coke bed.

In an aspect, the partial oxidation raises the temperature of the pyrolysis gas to between 500 and 2,500° C., preferably between 650 and 1,800° C. and most preferred between 800 and 1,300° C.

In order to ensure efficient decomposition of the tar, the pyrolysis gas should be heated to around 1,000-1,100° C. or at least preferably within the present temperature ranges.

But if the entrance temperature of the gas is too high when it enters the subsequent coke bed, the risk of the heat damaging the coke bed and/or equipment in or around the coke bed is increased. However, if the entrance temperature is too low the tar decomposition process will be more inefficient. Thus, the present temperature ranges present an advantageous relationship between safety and efficiency.

In an aspect, the coke bed has a temperature of between 400 and 2,000° C., preferably between 550 and 1,200° C. and most preferred between 650 and 1,000° C.

In order to ensure efficient decomposition of the tar in the coke bed, the coke bed should operate at around 750-900° C. or at least preferably within the present temperature ranges.

In an aspect, the coke bed is a fluid bed coke bed.

Fluid bed coke beds are relatively efficient in relation to tar decomposition but they are also particularly sensitive to deposits, slag formations, incrustations, fur and/or sedimentation of melted dust and it is therefore particularly advantageous to form the coke bed as a fluid bed coke bed in relation to the present invention.

It should be emphasised that the term "fluid bed" is to be understood as a device or process where gas, air, steam or another fluid is passed up through the coke material at high enough velocities to suspend the coke material and cause it to behave as though it were a fluid. This process is also known as fluidization.

In an aspect, the pyrolysis reactor is a fluid bed pyrolysis reactor.

Fluid bed pyrolysis reactors are relatively efficient in relation to tar decomposition but they are also particularly sensitive to deposits, slag formations, incrustations, fur and/or sedimentation of melted dust and it is therefore particularly advantageous to form the pyrolysis reactor as a fluid bed pyrolysis reactor in relation to the present invention.

In an aspect, the partial oxidation involves adding enough oxygen to combust all the pyrolysis gas between 5% and 70%, preferably between 15% and 60%, and most preferred between 25% and 50%.

It should be noted that the term "partial oxidation" in this embodiment means that some oxygen is added to the pyrolysis gas but not enough to fully combust the pyrolysis gas completely. I.e. according to this aspect enough oxygen is added that all the pyrolysis gas is partly combusted according to the presented amount ranges—such as e.g. around 35% (which is a more correct way to put it that saying that a percentage of the pyrolysis gas is combusted). The present amount ranges are advantageous in relation to tar decomposition. Furthermore, it should be noted that the oxygen may be added in the form of pure liquid or gaseous oxygen, an oxygen containing compound—such as air, methanol or other, a mixture of oxygen and water vapor, a mixture of oxygen and CO2 and/or in another form and/or mixed with another gas or vapor.

In an aspect, the pyrolysis gas has a temperature of between 100 and 1,000° C., preferably between 150 and 800° C. and most preferred between 200 and 600° C. when entering the partial oxidation reactor.

These temperature ranges present an advantageous relationship between functionality and safety.

In an aspect, the method comprises the step of generating the pyrolysis gas by heating biomass.

Pyrolyzing biomass is problematic in relation to tar content in the resulting gas and it is therefore particularly advantageous to use the present invention in relation to pyrolyzing biomass.

In an aspect, the method comprises the step of generating the pyrolysis gas by heating straw material.

Pyrolyzing straw material is problematic in relation to tar content in the resulting gas and because such biomass entails a relatively large amount of ash and unwanted particles in the pyrolysis gas and it is therefore particularly advantageous to use the present invention in relation to pyrolyzing straw material.

In an aspect, material in the pyrolysis reactor is heated by forming a flow of oxygen and/or superheated steam into the pyrolysis reactor.

Using superheated steam is advantageous in that the steam is substantially oxygen free and thereby will ensure efficient pyrolysis. But it takes a lot of energy to superheat the steam to the necessary temperature (typically around or a little over 500° C. in relation to a pyrolysis reactor). However, adding or instead generating a flow of oxygen (e.g. in the form of air) will ensure combustion that will raise the temperature efficiently.

In an aspect, the one or more filters remove at least 95% and preferably 99% of all the particles in the pyrolysis gas having a particle size down to 4µ from the pyrolysis gas.

If even more small particles are removed during the filtering process the risk of problematic deposits, slag formations, incrustations, fur and/or sedimentation is further reduced.

In an aspect, the one or more filters comprises a candle filter.

Candle filters can operate without any moving components and the few seals that could be needed are static and not subject to wear. Furthermore, a candle filter is relatively inexpensive and since it is relatively easy to clean and maintain it particularly advantageous to use a particle filter in relation to the present invention.

In this context the term "candle filter" should be understood as a filter comprising an outer housing inside which a plurality of circular, elongated filter element are arranged and where the gas to be filtered is guided into the elongated filter elements from the outside so that a particle cake will build up on the outside surface of the elements and so that the filter elements may be cleaned by backwashing so that the collected material will fall off and can be collected at the bottom of the filter housing.

The invention further provides for a two-stage gasifier arranged to remove tar from pyrolysis gas by means of a method according to any of the preceding claims.

A two-stage gasifier process is efficient at producing product gas but it is difficult and expensive to remove tar from the resulting product gas. It is therefore particularly advantageous to use the method according to the present invention in relation to a two-stage gasifier.

FIGURES

Figure 2:
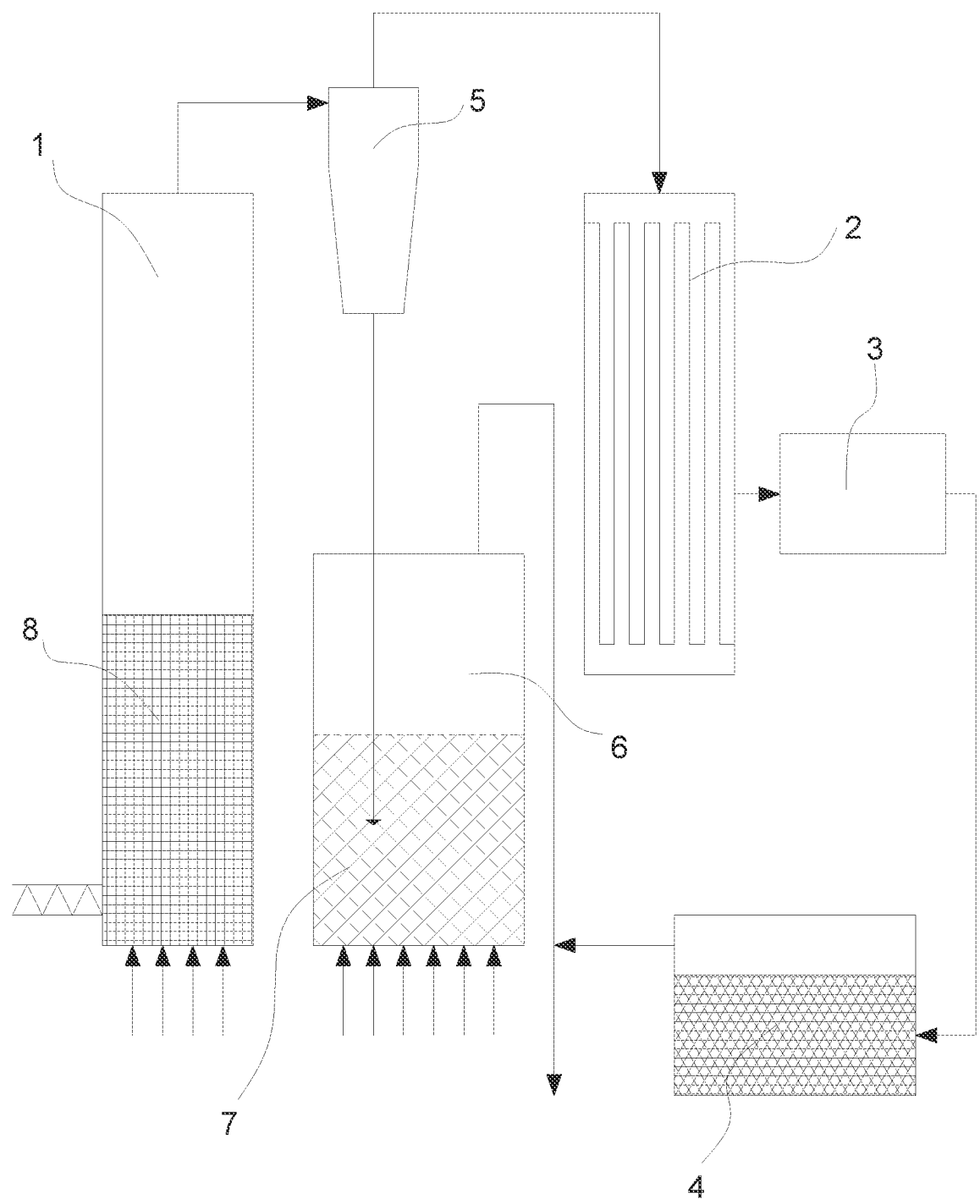

The invention will be described in the following with reference to the figures in which FIG. 1. illustrates a pyrolysis reactor followed by a gasifier where the coke bed is arranged internally in the gasifier, as seen from the front, and FIG. 2 illustrates a pyrolysis reactor followed by a gasifier where the coke bed is arranged externally to the gasifier, as seen from the front.

DETAILED DESCRIPTION

FIG. 1 illustrates a pyrolysis reactor 1 followed by a gasifier 6 where the coke bed 4 is arranged internally in the gasifier 6, as seen from the front.

In this embodiment fuel 8 is guided into the pyrolysis reactor 2 and superheated steam is guided into the pyrolysis reactor 2 at the bottom at a temperature at around 500° C. The superheated steam will then pyrolyze the fuel 8 as it moves up through the fuel 8 and the airborne pyrolyzed coke 7 will follow the pyrolysis gas out of the pyrolysis reactor 2 at the top of the pyrolysis reactor 2 where it in this embodiment enters a cyclone 5 that will separate the pyrolysis coke 7 from the pyrolysis gas and transfer the pyrolysis coke 7 to a gasifier 6.

In this embodiment, the fuel 8 is straw material but in another embodiment the fuel could be wood chips, (raw or pre-dried) animal slurry, (raw or pre-dried) sewage, surplus material from biochemical production or food production, another natural plant material or any other form of organic material or plastic, fossil fuel or other.

At the top of the pyrolysis reactor 2 the operation temperature will typically have dropped so that the pyrolysis gas and coke leaving the pyrolysis reactor 2 will have a temperature around 250-300° C.

From the cyclone 5, the pyrolysis gas will then continue to a high temperature gas filter 2 which will filter substantially all dust and particles out of the pyrolysis gas before it enters a partial oxidation reactor 3 where the pyrolysis gas is partially oxidized in that air, oxygen enriched air or pure oxygen is added to the pyrolysis gas so that the pyrolysis gas is partially combusted, which in turn will raise the temperature of pyrolysis gas to—in this embodiment—around 1,000-1,100° C. before the gas leaves the partial oxidation reactor 3. The partial oxidation will result in an efficient tar decomposition.

From the partial oxidation reactor 3 the hot pyrolysis gas is then reintroduced to the pyrolysis coke 7 in a coke bed 4 formed by a gasifier 6 arranged to gasify the pyrolysis coke from the cyclone 5.

In this embodiment, the pyrolysis gas is not cooled before it enters the coke bed 4 which usually could be a problem in that temperatures above 950° C. could damage the gasifier 6. But by introducing the partially oxidized pyrolysis gas into the middle of the coke bed 4, or at least away from the walls, bottom and/or top of the coke bed 4, the hot pyrolysis gas can be introduced to the coke bed 4 directly from the partial oxidation reactor 3. However, in another embodiment the temperature of the partially oxidized pyrolysis gas would be lowered e.g. to around 900-1,000° C. (preferably around 950° C.) before it entered the coke bed 4 e.g. by means of quenching, by means of a heat exchanger (e.g. to supply heat to the superheated steam entering the pyrolysis reactor 1 and/or coke bed 4) or other.

In this embodiment, the filter high temperature gas filter 2 is a hot gas candle filter but in another embodiment the filter 2 could also or instead comprise another type of hot gas filter such as sinter metal filters, sieves, strainers or other.

In this embodiment, the coke bed 4 is also heated by means of superheated steam entering the coke bed 4 at the bottom at a temperature of around 900° C. to ensure gasification of the pyrolysis coke 7 and efficient decomposition of the remaining tar in the pyrolysis gas. The resulting substantially tar free product gas then exits the coke bed 4 at the top at a temperature around 700-750° C. in this embodiment.

It should be underlined that the temperature examples mentioned above and below are specific examples relating to a specific type of wood chip being used as fuel 8 in this embodiment. However, if different fuel 8 was used some of the temperatures might be higher or lower.

In the embodiments disclosed in FIGS. 1 and 2 both the pyrolysis reactor 1 and the coke bed 4 (which in this case is also the gasifier 6) are formed as fluid bed reactors. But in another embodiment the pyrolysis reactor 1, the coke bed 4 and/or the gasifier 6 could also or instead be in a counterflow configuration, a co-current fixed bed ("down draft"), entrained flow configuration, plasma configuration and/or other or the pyrolysis reactor 1, the coke bed 4 and/or the gasifier 6 could also or instead be based on the fixed coke bed principle.

A "counterflow" configuration is to be understood any kind of pyrolysis reactor or coke bed where hot gas, air, steam or another gaseous substance is being fed in the bottom pyrolysis reactor or coke bed to either directly or indirectly drive the respective pyrolysis or gasification and the resulting gas is drawn from the top of the pyrolysis reactor or coke bed, while the fuel is fed at the top of the pyrolysis reactor or coke bed so that the closer the fuel moves to the bottom of the pyrolysis reactor or coke bed the more processed it is. I.e. fuel and gas moves in opposite directions—hence "counterflow". "Counterflow" is also often referred to as "updraft", "upward draft", "countercurrent" and other.

FIG. 2 illustrates a pyrolysis reactor 1 followed by a gasifier 6 where the coke bed 4 is arranged externally to the gasifier 6, as seen from the front.

In this embodiment, the system differs from the system disclosed in FIG. 1 in that the partially oxidized pyrolysis gas leaving the partial oxidation reactor 3 is guided into a separate coke bed 4 formed by means of coke from a separate process—i.e. not supplied from the preceding pyrolysis reactor 1. In this embodiment, the coke bed 4 could be formed from coke from an external combustion process or other.

In the coke bed 4 the coke will be gasified in a similar manner as discussed in relation with the gasifier 6 to enable decomposition of at least some of the remaining tar in the partially oxidized pyrolysis gas.

In this embodiment, the product gas leaving the external coke bed 4 will be mixed with the product gas leaving the gasifier 6 but in another embodiment the product gas leaving the external coke bed 4 could be drawn separately or it could be fed to the gasifier 6.

In a further embodiment, the coke bed 4 could be formed by a combination of external coke and pyrolysis coke—i.e. a combination of the embodiments disclosed in FIGS. 1 and 2.

The invention has been exemplified above with reference to specific examples of pyrolysis reactors 1, filters 2, gasifiers 6 and other. However, it should be understood that the invention is not limited to the particular examples described above but may be designed and altered in a multitude of varieties within the scope of the invention as specified in the claims.

LIST

1. Pyrolysis reactor
2. Filter
3. Partial oxidation reactor
4. Coke bed
5. Cyclone
6. Gasifier
7. Pyrolysis coke
8. Fue

The invention claimed is:

1. A method for reducing the tar content in pyrolysis gas generated in a pyrolysis reactor, said method comprising the steps of:
   guiding said pyrolysis gas through one or more filters to remove at least 90% of all the particles in said pyrolysis gas having a particle size down to 7 μm from said pyrolysis gas,
   partially oxidizing said pyrolysis gas in a partial oxidation reactor to remove tar from said pyrolysis gas, and
   guiding said pyrolysis gas through a coke bed to further remove tar from said pyrolysis gas,
   wherein said coke bed is arranged external to said pyrolysis reactor and external to a gasifier arranged to gasify pyrolysis coke generated in said pyrolysis reactor.

2. A method according to claim 1, wherein said method further comprises the step of guiding said pyrolysis gas through a cyclone to remove particles in said pyrolysis gas having a particle size down to 20 μm from said pyrolysis gas, before said pyrolysis gas is guided through said filter.

3. A method according to claim 2, wherein said particles that are removed by said cyclone are guided into said coke bed to form part of said coke bed and/or into a gasifier.

4. A method according to claim 1, wherein said particles that are removed by said one or more filters are guided into said coke bed to form part of said coke bed and/or into a gasifier.

5. A method according to claim 1, wherein said filter removes at least 90% of all the particles in said pyrolysis gas having a particle size down to 2 μm from said pyrolysis gas.

6. A method according to claim 1, wherein said partial oxidation raises the temperature of said pyrolysis gas to between 500 and 2,500° C.

7. A method according to claim 1, wherein said coke bed has a temperature of between 400 and 2,000° C.

8. A method according to claim 1, wherein said coke bed is a fluid bed coke bed.

9. A method according to claim 1, wherein said pyrolysis reactor is a fluid bed pyrolysis reactor.

10. A method according to claim 1, wherein said partial oxidation involves adding enough oxygen to combust all said pyrolysis gas between 5% and 70%.

11. A method according to claim 1, wherein said pyrolysis gas has a temperature of between 100 and 1,000° C. when entering said partial oxidation reactor.

12. A method according to claim 1, wherein said method comprises the step of generating said pyrolysis gas by heating biomass.

13. A method according to claim 1, wherein material in said pyrolysis reactor is heated by forming a flow of oxygen and/or superheated steam into said pyrolysis reactor.

14. A method according to claim 1, wherein said one or more filters remove at least 95% of all the particles in said pyrolysis gas having a particle size down to 4 μm from said pyrolysis gas.

15. A method according to claim 1, wherein said one or more filters comprises a candle filter.

16. A two-stage gasifier arranged to remove tar from pyrolysis gas by means of a method according to claim 1.

17. A method according to claim 1, said step of guiding said pyrolysis gas through one or more filters removes at least 90% of all the particles in said pyrolysis gas having a particle size down to 4 μm.

18. A method according to claim 1, wherein said method further comprises the step of guiding said pyrolysis gas through a cyclone to remove particles in said pyrolysis gas having a particle size down to 12 μm from said pyrolysis gas, before said pyrolysis gas is guided through said filter.

\* \* \* \* \*